Sept. 16, 1952 H. T. HAVLICK 2,611,118
TRICKLE CHARGER
Filed Nov. 22, 1947
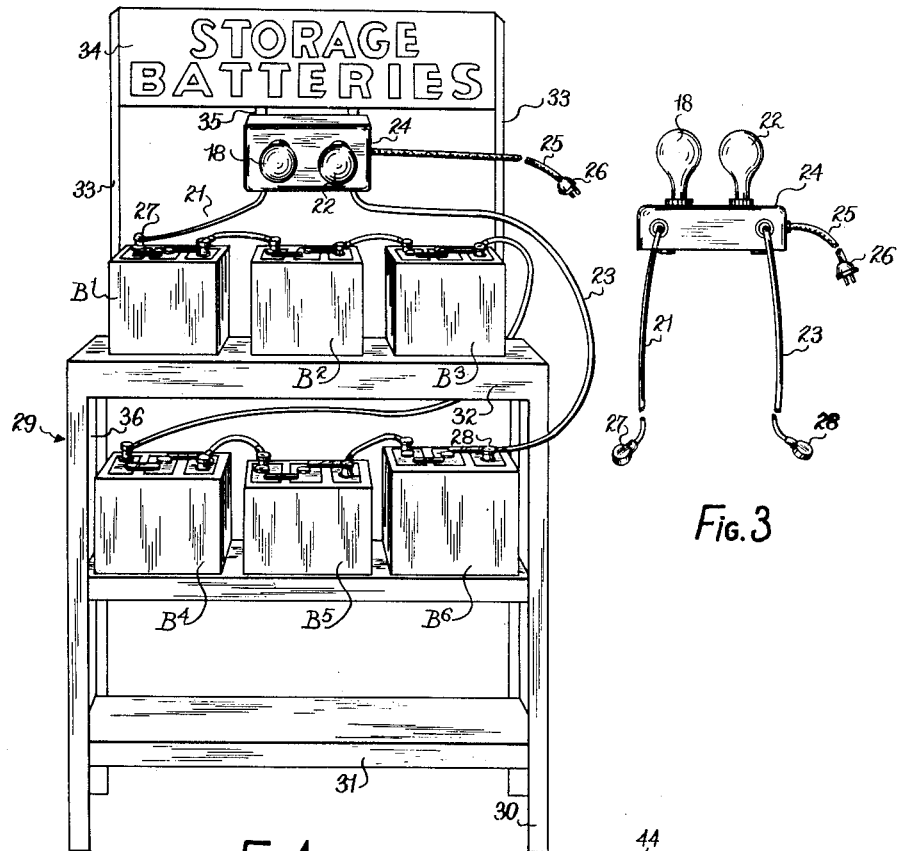
Fig.4
Fig.3
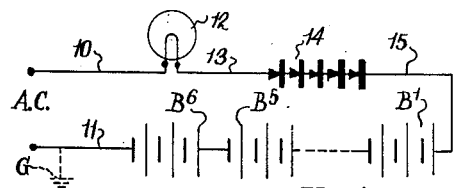
Fig.1
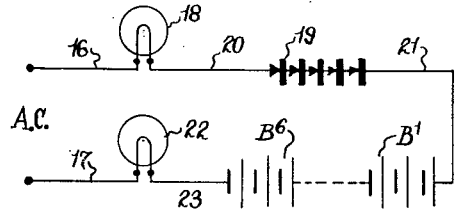
Fig.2
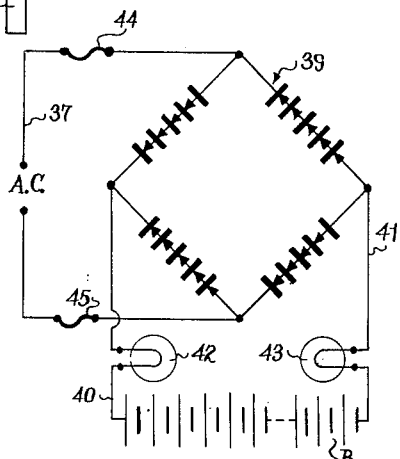
Fig.5
INVENTOR.
HOWARD T. HAVLICK
BY
Kwis, Hudson, Boughton & Williams
ATTORNEYS Patented Sept. 16, 1952

2,611,118

UNITED STATES PATENT OFFICE 2,611,118

TRICKLE CHARGER

Howard T. Havlick, Erieside, Ohio, assignor to Willard Storage Battery Company, Cleveland, Ohio, a corporation of West Virginia Application November 22, 1947, Serial No. 787,559

1 Claim. (Cl. 321—8)

This invention relates to storage battery charging circuits and units, and more particularly to a novel trickle charger adapted to maintain batteries at full charge.

Storage batteries of the lead-acid type lose their charge at the rate of approximately one point of gravity a day while in storage; therefore, if the batteries are allowed to stand for long periods of time without renewing the charge, sulphation occurs with resulting hardening and possible cracking of the plates and other undesirable consequences. This sulphation cannot be satisfactorily corrected by subsequent charging and, hence, if the condition is allowed to occur, the capacity of the battery is permanently reduced resulting in poor performance and short life when the battery is finally placed in service.

In order to prevent these difficulties, the charge on stored batteries should be frequently renewed or the batteries continuously charged at a very low rate. It is not, however, economical to employ the usual battery charging equipment of a garage, or a storage battery sales and service agency, for this purpose since such a use interferes with employment of the equipment for revenue producing charging of customer's batteries. Moreover, the usual charging equipment is not generally located adjacent the display or storage racks for the new batteries so that considerable time and labor must be expended in transporting the new batteries from display or storage to the charging equipment and back again to display or storage. Consequently, the proper maintenance of the charge on new batteries is frequently neglected.

Conventional trickle charger systems or units are not entirely satisfactory for this purpose because they are designed to charge only one battery at a time or, a plurality of batteries connected in parallel. In the latter event a plurality of output leads are necessary, and the total number of batteries that can be charged at one time is definitely fixed by the number of such leads. Moreover, when the number of batteries charged is less than the total number for which the charger is designed, special precautions must be taken to prevent unused leads of the charger from becoming shorted or grounded. Furthermore, conventional trickle chargers require the use of a transformer which renders the unit relatively heavy and expensive especially when the unit is designed to charge more than a single battery at a time.

One of the principal objects of the present invention is to provide an improved trickle charger circuit and/or unit for charging storage batteries which is simple and economical to construct and operate and which is adapted to charge one, or a plurality of storage batteries connected in series without objectionable change in the charging rate.

Another object of the invention is to provide an improved trickle charger circuit and/or unit for charging storage batteries connected in series so that only two output leads are employed for charging one or a plurality of batteries, the improved charger being so constructed and arranged that a change in the number and/or sizes of batteries charged does not materially change the charging rate.

A further object of the invention is to provide a novel trickle charger circuit and/or unit for charging storage batteries which is so constructed and arranged that shorting or grounding of the output leads thereof, or of one of the battery leads, will not injure the charger, the batteries being charged, or the power line to which the charger is connected.

A still further object of the invention is to provide an improved trickle charger circuit and/or unit for charging storage batteries which employs a conventional lamp bulb or bulbs whereby the charging current and/or voltage is automatically regulated by changes in resistance of the lamp bulb or bulbs as batteries are added to or removed from the charger circuit.

Another object of the invention is to provide an improved trickle charger circuit and/or unit of the type mentioned in the preceding object and in which the charging current and/or voltage is further regulated for large changes in the number or size of batteries charged by simply changing the wattage of the lamp bulb or bulbs employed.

The invention further resides in certain novel features of construction and combination and arrangements of parts, and further objects and advantages thereof will be apparent to those skilled in the art to which it pertains from the following description of the present preferred embodiment thereof, and certain modifications, described with reference to the accompanying drawing in which similar reference characters represent corresponding parts in the several views and in which:

Fig. 1 is a wiring diagram of a simplified form of the improved trickle charger circuit of this invention;

Fig. 2 is a wiring diagram of the present preferred form of the improved trickle charger circuit of this invention;

Fig. 3 is a side elevational view of a trickle charger representing a physical embodiment of the improved charging circuit illustrated in Fig. 2;

Fig. 4 is a perspective view of a storage battery display stand or rack provided with the improved trickle charger of the type shown in Fig. 3 for maintaining the charge upon storage batteries while on display; and Fig. 5 is a wiring diagram of another embodiment of the improved trickle charger circuit of this invention.

Referring now to the drawing, Fig. 1 illustrates the wiring diagram of a simplified form of trickle charger circuit embodying the principles of this invention. As shown, the charger circuit comprises wires or input leads 10 and 11 adapted to be connected to a conventional electrical power supply of the alternating current type which provides electrical current at a potential of approximately 110-115 volts. The wire 10 is connected to one terminal of a conventional filament type lamp bulb 12, the other terminal of which is connected by a wire 13 to one terminal of a rectifier 14. The other terminal of the rectifier is connected by wire 15 to one of the terminal posts of a storage battery $B_1$ which is to be charged. The other terminal post of the battery $B_1$ may be connected either directly to the wire 11 or to another battery or batteries such as $B_5$ and $B_6$ connected in series with battery $B_1$ and line 11.

The improved trickle charger circuit does not employ a transformer but instead utilizes the IR drop of a conventional, standard type, lamp bulb to reduce the voltage and current applied to the rectifier and batteries. Aside from the reduction in weight and cost of the charger resulting from the substitution of a readily available lamp bulb for the transformer, such a bulb also has the important advantages of providing automatic regulation in the circuit so that the charger can be employed with one or a plurality of batteries without a material change in the charging current. This desirable result is due to the change of resistance of the filament of the lamp bulb with changes in its temperature which is, in turn, dependent upon the current flow therethrough. That is to say, when the improved charger circuit is employed for charging a single six-volt storage battery the IR drop across the lamp bulb 12 will have a certain value depending upon the internal resistance of the battery, the counter E. M. F. created in the circuit by the battery, and the resistance of the rectifier 14. When more batteries are added to the charger circuit the IR drop across the lamp bulb will be decreased slightly so that the temperature of the filament thereof also drops slightly with a resulting small decrease in its resistance. Therefore, the charging current remains substantially the same whether a single battery or a plurality of batteries is employed.

The operation of the device can be further understood by considering the following experimental data which is offered by way of illustration but which is not to be considered as limiting the scope of the invention. A trickle charger was constructed as shown in Fig. 1, the lamp bulb 12 being a conventional 25 watt tungsten filament bulb and the rectifier 14 a conventional high voltage five plate selenium rectifier stack of the type made to replace the rectifier tube in small radios. The charger thus constructed was connected with a 12 volt lead-acid storage battery and to an A. C. power line providing electrical power at approximately 110 to 115 volts. The charging current of the battery was found to be .098 ampere. The same charger employed with a single 6-volt battery resulted in a charging current of .100 ampere, and when this trickle charger was employed with six 6-volt batteries the charging current was .080 ampere. It is apparent therefore that the charging current was not materially altered by changing the number or size of storage batteries connected with the charger and that this charging current was in the order of that customarily employed for providing a trickle or "makeup" charge for storage batteries to replace the portion of the charge lost while the batteries are in storage or on display.

Where more than six storage batteries are to be simultaneously charged by a trickle charger of this invention the charging current may drop below the value desired if a 25 watt bulb is employed since the inherent regulatory effect of the bulb may be exceeded. This difficulty is readily obviated by simply replacing the 25 watt lamp bulb 12 with a bulb of larger wattage. For example, it has been found that the same charger employing a 60 watt bulb will supply ten 6-volt batteries with a charging current of .160 ampere. A charging current intermediate that afforded by either the 25 or 60 watt bulbs can be readily obtained by employing a 40 watt bulb.

It will be apparent that, in the circuit illustrated in Fig. 1, the rectifier voltage rating must be at least equal to the maximum power line voltage plus the sum of the voltages of the batteries connected to the charger. This is necessary in order to prevent current from flowing in the reverse direction through the rectifier 14 thereby damaging the rectifier and/or the batteries, it being observed that the circuit illustrated in Fig. 1 provides only half-wave rectification. In the event a single commercial selenium rectifier of the type mentioned above does not have the necessary voltage rating for the desired capacity of the charger, several such rectifiers may be connected in series, thereby securing voltage "blocking" equivalent to the sum of the voltage ratings of each of the rectifier units.

The trickle charger circuit illustrated in Fig. 1 possesses a further advantage by virtue of its construction over that of prior art devices in that a short circuit in the rectifier, or between the wires 11 and 15 when one or both of these wires are disconnected from the batteries will no longer cause damage. Also if one or more of the batteries develops an internal short circuit when connected in the charging circuit or is shorted out of the circuit, such as by wire 11 falling on one of the batteries while the wire 15 is connected therewith, no harm will be done. In the event of the occurrence of any of these conditions the lamp bulb 12 will simply glow slightly more brightly. Since the lamp bulb is always in the circuit, the voltage drop across the remainder of the charging circuit cannot become excessive so that the current flow in the circuit will remain within reasonable limits and, therefore, no damage of either the charger or the alternating current supply line will result. Moreover, in view of the conventional practice of grounding one side of the alternating current distributing system, as by grounding one side of the generator and/or the distribution transformers, a ground at any place in the circuit of a conventional trickle charger may cause serious damage. However, when wire 11 of the circuit illustrated in Fig. 1 is connected to the grounded side of the alternating current supply, which ground is indicated by the dotted ground G connected with wire 11, and the wire 13 or wire 15 becomes grounded, when the latter wire is not connected to a battery or batteries, there would be no damage of the charger or the alternating current supply since the presence of the lamp bulb 12 prevents excessive IR drop and current flow.

It is not, however, always easy to determine which side of the power supply circuit is grounded and even if this be known it is necessary to employ a polarized type plug to insure that the wire 11 of the charging circuit shown in Fig. 1 is connected to the grounded side of the power supply. In order to obviate these difficulties the novel trickle charger circuit of this invention may be arranged as shown in Fig. 2, which is the present preferred form. As shown in this latter figure the charger circuit comprises wires or input leads 16 and 17 for connection to the A. C. power supply, and a filament type lamp bulb 18 which is connected in series with a rectifier 19 and the batteries to be charged by wires 20 and 21 respectively. In these respects the charger circuit illustrated in Fig. 2 is the same as that shown in Fig. 1. In addition to these elements, however, the charger circuit shown in Fig. 2 is provided with a second filament type lamp bulb 22 which is interposed between the wire or input lead 17 and the wire or output lead 23 connected with the last battery of the group to be charged. For ease in differentiating between the lamp bulbs 18 and 22 the former is termed the "ballast" bulb and the latter is termed the "protective" bulb. Ordinarily the protective bulb has a greater wattage rating than the bulb employed as the ballast. For example, when the ballast bulb is a 25 watt bulb, the protective bulb will be a 60 or 100 watt bulb.

With the construction illustrated in Fig. 2 it is immaterial which of input leads or wires 16 and 17 is connected to the grounded side of the alternating current supply and hence polarized plugs and similar expedients are no longer necessary. This form of the circuit has a further advantage in that a ground occurring at any point in the circuit even when a battery or batteries is connected therein will not result in any harm to the charger, the alternating current supply or the batteries themselves since one or the other or both of the lamp bulbs will limit the current flow. Aside from these added advantages the charger shown in Fig. 2 operates in the same manner and possesses the same advantages as does that illustrated in Fig. 1 and hence need not be described in further detail.

The improved charger circuit of this invention may be embodied in a suitably shaped box or container 24, see Figs. 3 and 4, which illustrate a physical embodiment of a charger whose circuit is that illustrated in Fig. 2. This box or container houses the rectifier 17 and the connections to the sockets for the lamp bulbs 18 and 22, the lamp bulbs preferably being positioned on the exterior of the housing for ease of access so that they may be readily interchanged when the number of batteries charged exceeds the limits of regulation afforded by the bulbs employed. The input leads 16 and 17, for connection with the A. C. power supply, may be combined into a conventional cable 25 provided with the usual plug 26, connections to the batteries being effected by the wires or output leads 21 and 23 which are provided with suitable terminals 27 and 28, respectively for engaging the terminal posts of the storage batteries. These terminals are preferably insulated in any suitable manner as are also the wires 21 and 23 to protect the operator from shocks when handling these wires or terminals when the charger is in operation. The straps or wires employed between the terminals of the batteries connected in series with the charger should likewise be insulated for the same reason.

It will be observed that a charger constructed in accordance with this invention requires only two battery terminal wires or leads such as 21 and 23 regardless of the number of batteries charged thereby since the batteries are connected in series by conventional straps or conductors. This is in contrast to the conventional chargers which charge a plurality of batteries in parallel and therefore require a pair of conductors for each battery. In conventional chargers of the type just mentioned the conductors which are not used, when the number of batteries charged is fewer than the total capacity of the charger, frequently become tangled and/or fall into contact with each other or various metallic objects creating shorts or grounds unless special precautions are taken. These difficulties are obviated with a trickle charger constructed in accordance with this invention for, since there are but two output leads permanently connected with the charger, the leads are always in use when the charger is in service whether one or a plurality of batteries is being charged The improved trickle charger may be mounted upon, or incorporated in, a suitable battery display stand or rack thereby facilitating the maintenance of the displayed batteries at full charge. Such a display stand or rack may have any desired form, and, by way of example, Fig. 4 illustrates one form of such an installation. The illustrated stand or rack, generally designated 29, comprises four vertical posts or legs 30 interconnected by spaced, horizontally extending shelves 31, the upper ends of the legs 30 being connected with a horizontally extending shelf or top 32. Extending vertically upward from the rear edge of the top 32 are spaced posts 33, the tops of which are united by a horizontally extending display panel 34 to which the improved battery changing unit may be attached by conventional means such as straps 35.

The display stand or rack may be constructed from either wood or metal and, if the latter be employed, may comprise suitable bent sheet metal members for forming the shelves 31, top 32, display panel 34, and side panels 36 of which the legs 30 form an integral part. The display stand may also be constructed by employing angle iron members for the legs 30, the cross members or shelves 31 and the posts 33, the batteries $B_1$, etc., then being supported upon the in-turned flanges of the cross members 31 which constitute skeleton shelves, the front and rear angle members being united by cross braces if desired. The charger illustrated in Fig. 4 is the same as that shown in Fig. 3, the circuit of which is illustrated in Fig. 2, and while the charger is shown as connected in series for charging six storage batteries of the lead acid type it will be apparent that a greater or lesser number of batteries may be so connected and charged as explained above.

Fig. 5 illustrates an embodiment of the invention in the form of a full wave charger circuit. A charger so constructed comprises input leads 37 and 38 for connection with the A. C. power supply, a rectifier bridge 39, output leads 40 and 41, and lamp bulbs 42 and 43 connected in the leads 40 and 41, respectively. The rectifier bridge 39 comprises four sets of selenium rectifiers connected in the conventional rectifier bridge manner with the output terminal leads 40 and 41 connected to two of the terminals of the bridge, and with the other two terminals of the bridge connected, respectively, to the input leads 37 and 38. Preferably, a conventional fuse or circuit breaker 44 is interposed in the lead 37 and a similar fuse or circuit breaker 45 is interposed in the lead 38. Each arm of the rectifier bridge may comprise one or more selenium rectifier units connected in series depending upon the desired voltage "blocking" rating desired for the charger and the lamp bulbs 42 and 43 are, as in the case of the chargers shown in Figs. 1 and 2, conventional filament type lamp bulbs. It will be readily apparent from the well-known operation of a rectifier bridge, and the previous detailed discussion of Figs. 1 and 2, that this form of charger operates to provide full wave charging of the batteries such as $B_1$ to $B_6$ of which one or more may be connected in series with the charger by the leads 40 and 41. Aside from the fact that this form of the charger provides full wave rectification of the alternating current it further differs from that of the charger illustrated in Fig. 2 in that the lamp bulbs are now connected on the output side of the rectifier. This provides protection if the connections to the battery or batteries are accidentally reversed since the bulbs will act to limit the current flow. The lamp bulbs when so connected also function as a protection in case of accidental grounding and to regulate the charging rate of the batteries.

It should now be apparent that a charger constructed in accordance with this invention possesses the advantages of being light in weight, economical and simple to construct and operate and substantially "fool proof." In addition, such a charger enables the charging of one or a plurality of batteries without the necessity of any changes in the circuit other than the possible substitution of a different size lamp bulb or bulbs when the number or size of the batteries charged exceeds the inherent regulation of the charging current provided by the lamp bulb or bulbs than present in the charger. Furthermore, short circuits or grounds of the batteries, the connecting straps therebetween, or of various parts of the charging circuit are rendered harmless by the protection afforded by the continuous presence of the lamp bulbs in the circuit. Other advantages of the invention will be readily apparent to those skilled in the art. While the invention has been described in detail with reference to the use of conventional lamp bulbs, it will be apparent that other types of resistors may be employed provided they effect the same regulation of the charging current as is effected by use of a lamp bulb or bulbs. Other modifications and adaptations will be apparent to those skilled in the art, and hence, the invention is not to be considered as limited to the exact constructions herein illustrated and described but only as required by the spirit and scope of the appended claim.

Having thus described my invention, I claim:

A storage battery charger adapted to be directly connected to a source of alternating current without the use of a transformer and to charge a single battery or a plurality of batteries connected in series, the said charger comprising two filament type lamp bulbs, a pair of input leads each adapted to have one end connected to the source of alternating current and the other end connected to one terminal of one of said bulbs respectively, rectifying means having its input connected to the other terminal of one of said lamp bulbs, a first output lead for said charger adapted to have one end connected to a storage battery terminal of one polarity and the other end connected to the output of said rectifying means, and a second output lead for said charger adapted to have one end connected to a storage battery terminal of opposite polarity and its other end connected to the other terminal of the other of said lamp bulbs, so that direct current of substantially constant amperage is supplied by said charger whether one or a plurality of storage batteries is connected therewith and the batteries and charger are protected from damage resulting from inadvertent shorting or grounding of the leads thereof.

HOWARD T. HAVLICK.

REFERENCES CITED

The following references are of record in the file of this patent:

UNITED STATES PATENTS

| Number | Name | Date |
|---|---|---|
| 1,094,733 | Lyle | Apr. 28, 1914 |
| 1,543,671 | Hinrichsen | June 30, 1925 |
| 1,771,330 | Grimditch | July 22, 1930 |
| 1,772,133 | Dobben | Aug. 5, 1930 |
| 1,829,603 | Mulder et al. | Oct. 27, 1931 |
| 1,852,893 | Mulder | Apr. 5, 1932 |
| 1,952,974 | Crouse et al. | Mar. 27, 1934 |
| 2,367,905 | Van Horn | Jan. 23, 1945 |
| 2,482,509 | Rively et al. | Sept. 20, 1949 |

FOREIGN PATENTS

| Number | Country | Date |
|---|---|---|
| 269,650 | Great Britain | Apr. 19, 1927 |